Patented Dec. 23, 1941

2,267,050

UNITED STATES PATENT OFFICE 2,267,050

METHOD OF TESTING FRUIT JUICES

Jesse W. Stevens, Ontario, Calif., assignor to California Fruit Growers Exchange, Los Angeles, Calif., a corporation of California No Drawing. Application February 24, 1940, Serial No. 320,661

9 Claims. (Cl. 23—230)

This invention relates to a method of testing fruit juices and more particularly to a method for testing certain new and desirable characteristics of fruit juices and fruit juice products.

This invention further relates to a method of testing the stability of cloud contained in fruit juices.

It is well known that fruit juices, and in particular citrus fruit juices, contain considerable quantities of finely divided solids and/or colloidal materials, which I term "cloud." The amount of the cloud and its characteristics depend to a very considerable extent upon the type of juice or juice product and the method of its manufacture. For example, a juice which has been prepared from citrus fruit by burring will contain larger amounts of suspended matter than juices prepared as, for example, by passing the fruit between rolls. Regardless of the manner in which the juice is prepared, there will be present suspended matter in the juice unless steps are taken to remove these finely divided and/or colloidal materials by filtration or by other means. However, for the most part it has been found desirable to retain the cloud, and, accordingly, processes have been developed by which fruit juices may be prepared having the cloud in stable suspension in the juice. These materials, in the case of many of the juices, for example orange juice, to a very large extent impart the characteristic color to the juice.

In addition to the finely divided and/or colloidal particles making up the cloud in the juice, it is desirable to have present coarse, insoluble solids comprising portions of the pulp and juice sacs, etc. Under normal conditions these coarser particles settle out, but their presence is highly desirable, since they assist in attaining a more natural appearance and enhance the flavor of the juice. These materials should be present in free form and not coagulated.

When the term "cloud" is used in this specification and in the appended claims it applies to very finely divided and/or colloidal materials present in the juice, and when stability of cloud is referred to, it applies to substantially homogeneous dispersion of the cloud throughout the fruit juice and to substantial absence of active enzymic substances having the ability to precipitate or coagulate this cloud. As opposed to the expression "stability of cloud" the term "flocculation of cloud" or simply "flocculation" is used.

The phenomenon of flocculation occurs when the suspended material present in the fruit juices precipitates or coagulates and/or settles out on standing, leaving a clear or nearly clear supernatant liquid. Such a phenomenon is believed to be caused by certain active enzymes or enzymic materials present in the juice.

Reference is made to my co-pending application Serial No. 288,687, now Patent 2,217,261, wherein there is disclosed a method for the stabilization of cloud in fruit juices and more particularly citrus fruit juices.

In order to place on the market satisfactory and salable juices containing cloud, the manufacturer must be able to test his products to determine the degree of stability of the finely divided and/or colloidal materials in the juice. In other words, he must be able to determine in advance the stability of the cloud and be assured that it will remain stable under commercial conditions over a considerable period of time so that his product will not become unsatisfactory by reason of any flocculation or coagulation of the cloud after he has sold the product.

I discovered that the unstability or flocculation of the cloud, that is, the coagulation of the insoluble solids, is due to active enzymes in the fruit juice. I have worked out a method of inactivating these enzymes by heat treating the juice. This is set forth in my co-pending application above referred to. Although such a process may seem at first quite simple, many factors must be taken into consideration, and the stabilization of the cloud is accomplished most completely only when the enzymes present are inactivated in toto. It may happen, therefore, that juices which were thought to have been freed of active enzymes do, in fact, have these enzymes present in a form sufficiently active to produce in time a precipitation or coagulation of the cloud. The unstability of the cloud in many cases is not observed until the juice is packaged and on the retailers' shelves. Since the juice is practically unmerchantable after the cloud has flocculated, the retailer and manufacturer suffer large losses whenever an unstable product is manufactured and distributed.

In the past, it has been impossible to test the cloud stability of a fruit juice as, for example, a citrus fruit juice, except by storing a sample for a considerable period of time under conditions which simulate commercial practice, and during this time observing whether or not flocculation occurs. Such a procedure is not only time-consuming but necessitates withholding the juice from sale until the test sample shows that the product is sufficiently stable.

The present invention relates, therefore, to a method of testing the degree of cloud stability of fruit juices, whereby the extremely long period of testing is eliminated and the manufacturer can be assured that the product which he is about to distribute has been adequately stabilized with respect to the cloud and that the product will continue to be stable throughout its commercial life.

Accordingly, an object of the present invention is to disclose and provide methods and means for testing fruit juices, whereby the degree of stability or unstability of the cloud may be readily determined.

Another object of the invention is to disclose and provide methods and means for testing citrus fruit juices, whereby the degree of stability or unstability of the cloud may be readily determined.

These and other objects, uses, and advantages of the invention will be more clearly understood from the detailed description given hereinafter.

The length of time during which a product will remain commercially satisfactory, as far as the stability of the cloud is concerned, could not, until I conceived of the present invention, be easily and quickly determined. By my method it is possible to determine the presence or absence of flocculating enzymes or enzymic substances in active form in fruit juices in a relatively short period of time.

The fundamentals of my test method were set forth by me in my co-pending application in particular examples applicable to orange juice as follows:

In testing a concentrated juice the concentrate is diluted with distilled water so that the final volume concentration ratio of the juice in the test samples will be 1.5 to 1. In making this dilution the ingredients are added as follows:

Concentrated juice to give
| | |
|---|---|
| volumes of juice__ | 1.5 |
| Pectin, commercially pure_____g__ | 0.11 |
| Sodium benzoate_____g__ | 0.225 |
| Barium chloride_____g__ | 0.4 |
| Citric acid crystals to give pH_____ | 2.9–3.0* |
| Distilled water to make_____ml__ | 100.0 |

*About 3.7% total citric acid, as anhydrous, is usually required in the test sample to give pH 2.9–3.0.

The pectin, sodium benzoate, barium chloride, and citric acid are added in the form of solutions, as follows:

| | |
|---|---|
| Pectin solution_____% pectin by weight__ | 4 |
| Benzoate solution_____g. benzoate/ml__ | 0.4 |
| Barium chloride solution, g. BaCl$_2$.2H$_2$O/ml__ | 0.3 |
| Citric acid solution__g. crystalline acid/ml__ | 0.5 |

The test sample is stored at 37° C. and the flocculation of cloud is checked by testing in a centrifuge. For this test a 5 ml. portion of the test sample is diluted to 20 ml. with distilled water. The diluted sample is centrifuged 2 minutes at 2000 R. P. M. in 15 ml. plain centrifuge tubes. Completely flocculated juice centrifuges out crystal clear. By the use of comparison samples, the extent of partial flocculation can be determined.

Flocculation of cloud is complete in the test sample before the juice sets up to a solid jelly structure. Some time after flocculation is complete the jelly structure becomes continuous or solid and syneresis becomes evident. During this later stage of the process, flocculation of cloud is easily detected by visual observation.

In testing a natural strength orange juice the test is carried out substantially as described above except for the amount of juice used in the test sample. The sample is prepared as follows:

| | |
|---|---|
| Juice (natural strength)_____ml__ | 100.0 |
| Pectin, commercially pure_____g__ | 0.11 |
| Sodium benzoate_____g__ | 0.25 |
| Barium chloride_____g__ | 0.40 |
| Citric acid crystals to give pH_____ | 2.9–3.0* |

*About 2.7% total citric acid, as anhydrous, will usually be required in testing the natural strength juice.

The test sample is stored and tested for cloud stability in the manner described above. For the centrifuge test a 6.4 ml. portion of sample is diluted to 16 ml. with distilled water.

In the test as described I make use of pectin sold commercially and produced in accordance with the teachings of U. S. Patent 1,497,884, the desired pectin being fairly rapid as to its setting time characteristics and being sold commercially under the designation Exchange Brand Citrus Pectin No. 433 U.

Flocculation of the juice within a short period of time, say somewhat less than 1 day, indicates the presence of flocculating enzymic substances in an active condition in appreciable amounts. If the juice product retains its fluidity, uniformity, and suspended cloud in stable condition and exhibits no undesired flocculation and jellification during a period of several days, this indicates that the juice product has the naturally occurring cloud-flocculating enzymes in inactive form and that it is free from cloud-flocculating enzymes in active form.

The above test on the concentrated juice may be made more strictly comparable with the test on the natural strength juice by using only enough concentrated juice to give 0.93 volume. Higher temperatures of storage, say 46° C. to 50° C. and preferably 48 C., may be employed at higher pH values of 3.05 to 3.25, and preferably 3.1 to 3.2.

In other modifications I improve the sensitivity and accuracy of test and still further reduce the time required to obtain the results. The example given hereinafter illustrates the application of the modified test to orange juice.

In testing a concentrated juice the concentrate is diluted with distilled water so that the final volume concentration ratio of the juice in the test samples will be 0.93 to 1. This dilution is equivalent to 93 ml. of natural strength juice per 100 ml. of final test mix. In making up the test mix, the ingredients are added as follows:

| | |
|---|---|
| Concentrated juice to give volumes of juice__ | 0.93 |
| Sodium benzoate_____g__ | 0.25 |
| Citric acid anhydrous to give pH of about_____ | 3.45–3.65* |
| Pectin_____g__ | 0.11 |
| Barium bromide (BaBr$_2$.2H$_2$O), g__ | 0.55 |
| Distilled water to make_____ml__ | 100.0 |

*About 1.1 to 1.2 g. total anhydrous citric acid is required.

The citric acid, pectin, sodium benzoate, and barium bromide are added in the form of solutions which I have found desirable to have in the following concentration:

| | |
|---|---|
| Sodium benzoate solution g. sodium benzoate per ml__ | 0.4 |
| Citric acid solution g. anhydrous citric acid per ml__ | 0.5 |
| Pectin solution_____% pectin by weight__ | 3.06 |
| Barium bromide solution g. BaBr$_2$.2H$_2$O per ml__ | 0.306 |

In preparing the test mix, all of the ingredients, except the barium bromide solution and a little water, are added and thoroughly mixed. The barium bromide solution is then added slowly while constantly stirring the solution.

It is essential to add the barium bromide only after the pectin has been thoroughly dispersed throughout the test mix in order to prevent precipitation of some of the pectin. Finally the solution is made up to 100 ml. by addition of the remaining amount of distilled water.

It is essential, under the conditions set forth above, that the pH of the test mix fall within the range of 3.45 to 3.65, and preferably within the range of 3.50 to 3.60. It may be necessary to change the amount of acid added in the formula to take care of seasonal and other natural variations in the juice being tested.

The test mix may be stored in one-ounce, screw-cap bottles at a temperature of from 56° C. to 59° C., but preferably about 58° C. The flocculation of the cloud is checked in accordance with the following procedure:

The bottle containing the test mix is gently rotated to effect a uniform distribution of suspended material. A 7 ml. portion of the mix is removed from the bottle and diluted with distilled water to make 16 ml. I have found it necessary to follow a uniform dilution procedure in order to insure consistent results. The diluted sample is centrifuged 2 minutes at 2000 R. P. M. in 15 ml. plain centrifuge tubes. Completely flocculated juice centrifuges out crystal clear. By the use of comparison samples, the extent of partial flocculation may be determined. With a stable juice, or one in which the cloud has not flocculated, the diluted sample will have a good cloud after being centrifuged.

In testing a natural strength orange juice, for example, the test is carried out substantially as described above, except for the formula employed in making up the test mix. For testing natural strength orange juice the test mix is prepared as follows:

| | |
|---|---|
| Juice (natural strength) ml | 93.0 |
| Sodium benzoate g | 0.25 |
| Citric acid anhydrous to give pH in the range of | 3.45–3.65 |
| Pectin g | 0.11 |
| Barium bromide (BaBr$_2$.2H$_2$O) g | 0.55 |

The test sample is stored and tested for the degree of cloud stability in the manner described above.

In the test, as described, I make use of pectin sold commercially and produced in accordance with the teachings of U. S. Patent 1,497,884, the desired pectin being fairly rapid as to its setting characteristics and being sold commercially under the designation "Exchange Brand Citrus Pectin No. 433 U."

Juice which exhibits flocculation by the above mentioned test within a short period of time, say after having been stored several hours, indicates the presence of appreciable amounts of active enzymic substances. On the other hand, if the juice product retains its fluidity, uniformity, and suspended cloud in stable condition and exhibits no undesired flocculation and jellification under the above mentioned condition of testing and during a test period of two or three days, or longer, this indicates that the juice product has the naturally occurring cloud flocculating enzymes in substantially inactive form, and that it is sufficiently free from cloud flocculating enzymes in active form. Such a juice product retains its cloud in stable condition under all conditions which said juice product is normally subjected to in commercial use.

The factors that are found to be of particular importance in obtaining satisfactory control of the testing of the flocculation process in fruit juices are the type and amount of cation available for precipitation of the pectic end products, the pH of the test mix, the storage temperature at which the test is carried out, the amount of juice used in the test, the type and amount of soluble pectin used in the test, the total soluble solids in the test mix, and the amount of active enzymes or enzymic materials contained in the juice, as well as other factors of somewhat lesser importance. I have found that the rate of flocculation and the type or character of the flocculated cloud or precipitate, as well as the rate of settling of the precipitate, may be influenced to a considerable extent by the addition of a suitable cation to react with the end products produced by the enzyme action. I have found further that the following cations may be successfully used: barium, strontium, calcium, magnesium, manganese, sodium, copper, silver, lead, mercury, zinc, and cobalt. From the distribution of these over the Periodic Table, it is apparent that metallic cations in general will produce the effect, the conditions of the test being altered as required for the various elements. Barium seems to be the most satisfactory and therefore I prefer it for general use. It has been found that nearly the maximum accelerating effect may be obtained by using the bromide of barium, although other anions may be used, as, for example, the chloride, iodide, or nitrate.

The anions appear to react in accordance with the following order of activity when the pH of the test mix is maintained within the range of 3.24–3.31, the most active being placed first: bromide, iodide, nitrate, chloride, acetate, and formate. However, the order of activity may vary if the pH range is changed as, for example, in the pH range of from 3.08–3.12, the activity of the anion is in the following order: chloride, nitrate, iodide, bromide, acetate, and formate. From these data it may be generalized that the halides are generally dependable for this purpose.

Larger amounts of the salts have some additional accelerating effect. It seems that the amount required to give the maximum effect depends upon the amount of juice used in the test, and the amount of active enzymes or enzymic materials remaining in the supposedly stabilized juice, as well as other factors. I have found that about 0.55 g. of the added accelerator per 100 ml. of test mix appears to be the maximum required to give uniformly satisfactory results.

In addition, I have found that for the flocculation test the probable optimum pH to permit the activity of the enzymic substances when barium bromide is used as the accelerator and when the test mix is held at a storage temperature of about 56°–59° C., is from about pH 3.45 to pH 3.65. Furthermore, I have found that in this temperature range, the rate of flocculation decreases rapidly as the pH is decreased below the optimum, particularly if the pH is decreased much below about 3.4. When pH values are adjusted to above the optimum range to permit the activity of the enzymic substances, the rate of decrease in flocculation is much less apparent. It is to be noted that the optimum pH range to permit the activity of the enzymic substances is also dependent upon the storage temperature and that the range shifts upward as the temperature of storage is increased, or the pH shifts downward as the temperature of storage is lowered below 45° C. More rapid flocculation is usually obtained at the higher temperatures. In general, then, a storage temperature should be chosen so as to promote the action of any active enzymic substances.

Other acids than citric acid may be used to adjust the pH of the test mix, as, for example, hydrochloric acid, or hydrobromic acid.

I have found that the optimum pH to permit the activity of the enzymic substances varies somewhat with the different accelerating salts used for the purpose of the test, as mentioned hereinbefore. It seems, for example, that the optimum pH when sodium chloride is used is about pH 2.85 to about pH 3.05. When other accelerating salts are used, it will be necessary to readjust the conditions of the test as to optimum pH, storage temperature, amount of accelerator, juice content, etc.

As mentioned above, the juice content of the test mix may have a marked effect on the rate of flocculation, depending, of course, upon the particular pH of the mix and the storage temperature. With the other factors of the test mix adjusted as described above, the juice content may be varied from 0.4 to 1.6 volumes without any marked change in the rate of flocculation. However, I have found that the optimum range is from about 0.7 to 1.1 volumes.

If the juice is diluted so that 1 volume of the test mix contains 0.93 volume of natural strength juice, and the pH of the test mix is found to lie within a range below about 3.45, it will be necessary to choose an accelerator which will be effective in causing a flocculation of the cloud in the test sample within the pH range which is so obtained. For example, barium chloride is an effective accelerator when the pH is within a range of below 3.45. In those cases the temperature of storage is adjusted in accordance with the pH. A juice giving a test mix of about pH 2.8 should be stored at a temperature of about 42° C. On the other hand, a juice giving a test mix of about pH 3.35 should preferably be stored at a temperature of about 51° C.

When the process of manufacture of a concentrated juice being tested is known, no particular difficulty will be experienced in diluting the product to the equivalency of a natural strength juice. In testing concentrated juice products of unknown characteristics, various factors should be taken into consideration in order to be reasonably sure of diluting the product to correspond to the natural strength juice, since concentrated products often contain added ingredients such as sugar or acid, which would indicate, from a determination of the soluble solids content or total acidity, that the product has a greater juice concentration than is actually the case. Under such circumstances the relationship of the soluble solids, pH, total acidity, and preferably the ash content of the concentrated product being tested should be correlated with the relationship of these same factors in natural strength juice, and the concentrate then diluted with water in order to obtain approximately the equivalency of the natural strength juice.

Although the foregoing examples have specified the use of orange juice, both natural strength and concentrated, and also have referred to such juices which may have been acidified, it is to be understood that the tests are applicable to other juice products, as, for example, grapefruit juice products, which may be adjusted to fall within the pH range of the barium chloride test mixes by the addition of citric acid or by the use of some neutralizing agent such as sodium hydroxide or sodium bicarbonate, or by using a smaller proportion of juice in the test mix. Regardless of the method employed, I adjust the pH of the test mix to within the range of from 3.0 to 3.2. At this pH range the test mix is stored at a temperature of 45° C. On the other hand, when lemon juice or lemon juice products are to be tested, I have found it desirable to use the following formula:

| | | |
|---|---|---|
| Juice, natural strength | ml | 65.0 |
| Sodium benzoate | g | 0.25 |
| Pectin (added as a 3.3% sol) | g | 0.10 |
| Barium hydroxide (anhydrous) to give pH within 2.95–3.15, about | g | 1.–1.1 |
| Water, distilled to make | ml | 100. |

A test mix is conveniently prepared in a 100 ml. volumetric flask. The ingredients are added in the order given in the formula above. The barium hydroxide which acts both as a neutralizing agent and an accelerator is first mixed with a small amount of distilled water which may be heated to about 50° C. in order to facilitate the solution. This solution is then added to the test mix with agitation. As has been mentioned before, it is necessary to add the barium hydroxide after the pectin has been thoroughly mixed with the other ingredients of the test mix in order to prevent precipitation of some of the pectin. The test mix is then diluted to 100 ml. with distilled water and subsequently transferred to one-ounce, screw-cap bottles for storage. The test mix is preferably stored at a temperature of about 45° C.

When testing concentrated lemon juice products enough of the concentrate is used to give the equivalent of 65 ml. of natural strength juice per 100 ml. of the test mix. In all other respects the test is carried out as for the natural strength juice. After storage, a portion of the test mix is centrifuged in plain 15 ml. centrifuge tubes for two minutes at 2000 R. P. M. It is to be particularly noted that the test mix is not to be diluted. Test mixes which show little or no flocculation, after having been stored four or five days in accordance with the above test, indicate that the juice product from which they were prepared will have such a degree of stability as to be satisfactory for all commercial purposes. If the test mix shows complete or partial flocculation after four or five days storage, the juice product from which the test mix was prepared will not have that degree of stability necessary for all commercial uses to which the juice product may be put. Furthermore, when testing lemon juice, other accelerators may be used which tend to neutralize a portion of the acidity, or the acidity may be neutralized with NaOH or sodium bicarbonate and the barium ion added in the form of $BaCl_2.2H_2O$. If other barium salts are used to supply the barium ion, they should be added in amounts equivalent to 0.4 g. of $BaCl_2.2H_2O$ per 100 ml. of test mix.

The use of added pectin in the test mix is an important factor in obtaining a rapid rate of flocculation and uniform results. Since it is known that the amount of soluble pectin varies with the various juices and the methods of manufacture, it may be that in many cases there will be insufficient naturally occurring pectin to cause flocculation of the cloud to be unerringly detected in the test. Commercially available pectins vary greatly in the time required for enzymic change, which becomes apparent as a precipitation or coagulation of the cloud, and consequently I have found it necessary to use a pectin of known stability to obtain comparable results. I have found it desirable to add sufficient pectin to completely precipitate or coagulate the cloud in the presence of the accelerator independent of any pectin which may be contained in the juice being tested. This amount, of course, will vary, depending upon the amount of active enzyme present in the juice or the time required for flocculation, but I have found that about 0.1% added pectin, based on the final weight of the test mix, appears to be sufficient to give satisfactory results. Further, I have found that this pectin should preferably be added in sol form.

In comparing the juices of natural strength, that is, as expressed from the fruit and not concentrated, with concentrated juices, I have found that high concentrations of the soluble solids, for example, within the range of from 45 to 65% solids, interferes to some extent with the flocculation process. This also applies to those natural strength juices which have been fortified with sugar or other materials which tend to increase the percentage of soluble solids to within this range.

It can be seen from what I have said hereinabove that a very careful control of all of the ingredients used in the test mix must be maintained and that variation in one may require variations in the other factors.

Having thus described my invention, its mode of operation, and the conditions conducive to its effective operations, it is to be understood that numerous changes and variations may be introduced without departing from the spirit thereof. All such changes and modifications as come within the scope of the appended claims are to be considered as embraced therein.

I claim:

1. A method for determining the presence of active enzymic substances in citrus juice products which comprises adjusting the pH of said citrus juice product to within a range of from about 3.45 to 3.60, adding thereto a pectin sol and an accelerator comprising barium bromide, and storing said citrus juice product at such a temperature as to promote and for a time sufficient to permit flocculation and render any coagulated material observable.

2. A method for determining the presence of active enzymic substances in citrus juice products which comprises adjusting the pH of said citrus juice product to within a range of from about 2.85 to 3.60, adding thereto a pectin sol and an accelerator of the group consisting of metal halides, and storing said citrus juice product at such a temperature as to promote and for a time sufficient to cause flocculation and render any coagulated material observable.

3. A method for testing fruit juice products containing pectin for the presence of active enzymic substances in which the juice product is tested within a pH range permitting activity of the enzymic substances which comprises adding as an accelerator a water-soluble metal compound effective to hasten the action of any enzymes present, and storing the juice product at such a temperature as to promote and for a time sufficient to permit any active enzymic substances to hasten flocculation of suspended material.

4. A method for testing citrus juice products containing pectin for the presence of active enzymic substances in which the citrus juice product is tested within a pH range of from about 2.85 to 3.60, which comprises adding thereto an accelerator comprising a water-soluble metal compound which acts to hasten enzymic action and storing the juice at such a temperature as to promote and for a time sufficient to permit the action of any active enzymic substances to be manifested by flocculation of suspended material.

5. A method for determining the presence of active enzymic substances in a concentrated orange juice product which comprises diluting said orange juice product to a fixed volume ratio, adjusting the pH of said diluted juice product to within a range of from about 3.45 to 3.60, adding a pectin sol thereto and an accelerator comprising barium bromide, storing the diluted orange juice mixture at such a temperature as to promote and for a time sufficient to permit the action of any active enzymic substances, and subsequently diluting a portion of the stored orange juice with distilled water and centrifuging the same.

6. A method for determining the presence of active enzymic substances in orange juice products which comprises adjusting the pH of said orange juice product to within a range of from about 3.05 to 3.25, adding a pectin sol thereto and an accelerator comprising barium chloride, diluting said mixture to a fixed volume, storing said diluted juice at a temperature of from about 46° C. to 50° C. and for a time sufficient to permit the activity of any active enzymic substances, and subsequently diluting said stored sample and centrifuging the diluted portion for the purpose of settling any coagulated cloud.

7. A method for determining the presence of active enzymic substances in concentrated orange juice which comprises the steps of diluting the concentrated orange juice with sufficient water to reduce the concentration of said orange juice to that of a natural strength juice, adjusting the pH of 93 ml. of said diluted orange juice to within a range of from 2.9 to 3.0 by means of citric acid, mixing therewith 0.11 g. of pectin in the form of a 3% pectin sol, adding thereto an accelerator comprising 0.4 g. of $BaCl_2.2H_2O$ in the form of a solution having a concentration of 0.3 g. per ml., storing the mixture at a temperature of about 37° C. for a time sufficient to permit the action of any active enzymic substances, subsequently diluting a portion of the stored mixture with water, and centrifuging the same.

8. A method for determining the presence of active enzymic substances in citrus juice products which comprises adjusting the pH of said citrus juice product to within a range of from about 3.45 to 3.60, adding thereto a pectin sol and an accelerator comprising barium bromide, storing said citrus juice product at such a temperature as to promote and for a time sufficient to permit the action of any enzymic substances, and centrifuging a portion of the stored citrus juice product.

9. A method for determining the cloud flocculating tendency of citrus juice products which comprises adjusting the pH of said citrus juice product to within a range of from about 2.85 to 3.60, adding thereto a pectin sol and as an accelerator a water-soluble metal compound which acts to hasten enzymic action, and storing said citrus juice product at such a temperature as to promote and for a time sufficient to permit any flocculation which may take place.

JESSE W. STEVENS.